US012728606B2

(12) United States Patent
Brinckmann et al.

(10) Patent No.: US 12,728,606 B2
(45) Date of Patent: Sep. 8, 2026

(54) APPARATUS AND METHOD FOR PHOTOLITHOGRAPHICALLY FORMING AN OPHTHALMIC LENS

(71) Applicant: Alcon Inc., Fribourg (CH)

(72) Inventors: Felix Brinckmann, Roßdorf (DE); Nils Schweizer, Bad König (DE)

(73) Assignee: Alcon Inc., Fribourg (CH)

( * ) Notice: Subject to any disclaimer, the term of this patent is extended or adjusted under 35 U.S.C. 154(b) by 279 days.

(21) Appl. No.: 18/490,883

(22) Filed: Oct. 20, 2023

(65) Prior Publication Data

US 2024/0131810 A1 Apr. 25, 2024
US 2024/0227328 A9 Jul. 11, 2024

Related U.S. Application Data

(60) Provisional application No. 63/380,389, filed on Oct. 21, 2022.

(51) Int. Cl.
*B29D 11/00* (2006.01)

(52) U.S. Cl.
CPC .............................. *B29D 11/00153* (2013.01)

(58) Field of Classification Search
CPC ................................................ B29D 11/00153
(Continued)

(56) References Cited

U.S. PATENT DOCUMENTS 6,827,885 B2 * 12/2004 Altmann .......... B29D 11/00134 264/1.36
2011/0116035 A1 * 5/2011 Fritsch ..................... G02C 7/04 351/159.02

(Continued)

FOREIGN PATENT DOCUMENTS

WO 2009123883 A2 10/2009
WO 2010117732 A2 10/2010
WO 2018172888 A1 9/2018

*Primary Examiner* — Sharrief I Broome
(74) *Attorney, Agent, or Firm* — Nicholas Smith

(57) ABSTRACT

An apparatus (1) for photolithographically forming an ophthalmic lens (L) comprises:

a container (2) comprising a container bottom (20) with an inner surface (200) including a concave portion (201);

a piston (4) comprising a distal piston end face (400) with a convex portion (401);

wherein the piston (4) is arranged in the container (2) such that the convex portion (401) faces the concave portion (201), and wherein the piston is movably arranged in the container (2);

a light source (5, 50) being arranged beneath the container bottom (20) for emitting light towards the container bottom (20);

a mask (6) arranged between the light source (5, 50) and the container bottom (20), the mask (6) comprising a plurality of pixels (60) which are configured to be individually controlled to either allow the light emitted from the light source (5, 50) to pass through the individual pixels (60) and to impinge on that part of the container bottom (20) having the concave portion (201) of the inner surface (200), or to not allow the light emitted from the light source (5, 50) to pass through the individual pixels (60) and to prevent the light from impinging the container bottom (20), and a control unit (7) for controlling the individual pixels (60) of the mask (6) to allow for a formation of the ophthalmic lens (L) layer by layer (L1-L4).

8 Claims, 8 Drawing Sheets

(58) Field of Classification Search
USPC ........................................................ 351/159.73
See application file for complete search history.

(56) References Cited

U.S. PATENT DOCUMENTS

| | | | | |
|---|---|---|---|---|
| 2012/0268712 | A1* | 10/2012 | Egan | G02C 7/04 351/159.34 |
| 2016/0109726 | A1* | 4/2016 | Tai | G02C 7/049 351/159.04 |

* cited by examiner

APPARATUS AND METHOD FOR PHOTOLITHOGRAPHICALLY FORMING AN OPHTHALMIC LENS

The present invention generally relates to the field of forming ophthalmic lenses. More particularly, the present invention relates to an apparatus and method for photolithographically forming an ophthalmic lens, in particular a contact lens such as a soft contact lens, for example a silicone hydrogel contact lens.

In the mass manufacture of ophthalmic lenses, in particular contact lenses such as soft contact lenses, for example silicone hydrogel contact lenses, the lenses are typically manufactured in extremely large numbers by more or less fully automated mass manufacturing processes and fully automated production lines (as such lenses are for single use only and are disposed of after use). However, prior to mass manufacturing it is required to first produce a low number of prototype lenses, for example in order to determine whether the lenses made of a particular candidate material have the desired properties, and/or whether the candidate material is suitable for mass manufacturing. Typically, therefore, in a first step low numbers of prototype lenses having different geometries and diopters are produced to confirm that the lenses made from a specific candidate material have the desired properties, and whether the candidate material is suitable for mass manufacturing.

Production of the afore-mentioned low numbers of prototype lenses of different candidate materials is not possible in the fully automated production lines described above, since these production lines are specifically configured/adapted for only one particular lens-forming material. And even though fully automated production lines are known which are capable of producing smaller lots of lenses and which are also capable of performing a lot change 'on-the-fly', so that lenses having different geometries can be produced by the same production lines without the need to interrupt the running production process, these production lines are still specifically configured/adapted for only one particular lens-forming material.

It is therefore an object of the invention to suggest an apparatus and a method for efficiently producing low numbers of lenses which may be made from different materials and which may have different geometries.

This object is achieved by an apparatus and a method as they are specified in the independent claim directed to the apparatus or method, respectively. Further advantageous aspects of the apparatus and method are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the term "about" is included and is explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

The term "ophthalmic lens" as used herein is to be understood to comprise contact lenses, in particular soft contact lenses, as well as intraocular lenses. Also, it is to be understood to comprise devices which are to be placed on the eye (onlays or other extraocular devices) and which may not have an optical effect, for example devices comprising voids or hollow spaces therein which are capable of storing and delivering a medicament/drug or lacrimal fluid to the eye. For example, such devices may be placed in the lower eyelid of a user.

The apparatus according to the invention is an apparatus for photolithographically forming an ophthalmic lens, in particular a contact lens such as a soft contact lens, for example a silicone hydrogel contact lens. The apparatus comprises:

- a container comprising a container bottom with an inner surface including a concave portion having a shape of a posterior surface of the ophthalmic lens to be formed, with a first longitudinal axis running through the center of the concave portion;
- a piston comprising a distal piston end face with a convex portion having a shape complementary to the shape of the posterior surface of the ophthalmic lens to be formed, with a second longitudinal axis running through the center of the convex portion;
- wherein the piston is arranged in the container such that the convex portion of the distal piston end face faces the concave portion of the inner surface of the container bottom, with the first longitudinal axis running through the center of the concave portion of the inner surface of the container bottom and the second longitudinal axis running through the center of the convex portion of the distal end face of the piston being coincident,
- and wherein the piston is movably arranged in the container along the second longitudinal axis towards and away from the container bottom.

The apparatus further comprises

- a light source being arranged beneath the container bottom for emitting light towards the container bottom;
- a mask arranged between the light source and the container bottom, the mask comprising a plurality of pixels which are configured to be individually controlled to either allow the light emitted from the light source to pass through the individual pixels and to impinge on that part of the container bottom having the concave portion of the inner surface, or to not allow the light emitted from the light source to pass through the individual pixels and to prevent the light from impinging the container bottom, and
- a control unit for controlling the individual pixels of the mask to allow for a formation of the ophthalmic lens layer by layer.

In accordance with an aspect of the apparatus according to the invention, the mask may be a Thin-Film-Transistor (TFT) mask. TFT masks are well-known as being reliably controllable pixel-by-pixel and are readily available on the market.

In accordance with another aspect of the apparatus according to the invention, the control unit may be configured to control the mask in a manner such that the photolithographically formed ophthalmic lens comprises voids and/or channels.

Yet in accordance with another aspect of the apparatus according to the invention, the apparatus may further comprise an additional light source which is arranged at a predetermined distance above the piston, to allow for additional curing of those layers of the ophthalmic lens that are already formed and adhered to the convex portion of the distal end face of the piston when the piston is in an uppermost position.

The method according to the invention is a method for photolithographically forming an ophthalmic lens, in particular a contact lens such as a soft contact lens, for example a silicone hydrogel contact lens. The method comprises:

a) providing an apparatus according to the invention as described above;

b) dispensing an uncured lens-forming material into the container;

c) moving the piston along the second longitudinal axis towards the container bottom until a cavity filled with a first layer of the uncured lens-forming material is formed between the convex portion of the distal piston end face and the concave portion of the inner surface of the container bottom, the first layer of the uncured lens-forming material having a thickness less than the thickness of the ophthalmic lens to be formed;

d) controlling the mask with the aid of the control unit in a manner so as to allow light to pass through the mask to cure the first layer of the uncured lens-forming material contained in the cavity to form a cured first layer of the ophthalmic lens;

e) moving the piston along the second longitudinal axis away from the container bottom, with the cured first layer of the ophthalmic lens adhered to the convex portion of the distal piston end face, thus allowing the uncured lens-forming material to flow into a space between the cured first layer of the ophthalmic lens adhered to the convex portion of the distal piston end face and the container bottom;

f) moving the piston along the second longitudinal axis towards the container bottom until a further layer of uncured lens-forming material is enclosed between the cured first layer of the ophthalmic lens adhered to the convex portion of the distal piston end face and the concave portion of the inner surface of the container bottom;

g) controlling the mask with the aid of the control unit in a manner so as to allow light to pass through the mask to at least partially cure the further layer of the uncured lens-forming material contained in the space to form a cured further layer of the ophthalmic lens;

h) moving the piston along the second longitudinal axis away from the container bottom, with the cured first layer and the cured further layer of the ophthalmic lens adhered to the convex portion of the distal piston end face, thus allowing the uncured lens-forming material to flow into the space between the cured further layer of the ophthalmic lens and the concave portion of the inner surface of the container bottom; and i) repeating steps f) to h) until the ophthalmic lens is formed.

According to an aspect of the method according to the invention, in step g) the mask maybe controlled in a manner such that the further layer is only partially cured to form voids and/or channels.

In accordance with still a further aspect of the method according to the invention, the method may further comprise providing a medicament in the voids and/or channels.

In accordance with yet a further aspect of the method according to the invention, the method may further comprise providing saline or an artificial lacrimal fluid in the voids and/or channels.

Yet in accordance with another aspect of the method according to the invention, the method may further comprise providing devices, for example electronic devices, in the voids.

With the aid of the apparatus and method according to the invention it is possible to efficiently produce low number of (prototype) ophthalmic lenses from different lens-forming materials and having different geometries. For the formation of a first layer of the ophthalmic lens, the piston with the distal piston end face is moved down to a position in which a cavity corresponding in shape to the first layer of the ophthalmic lens to be formed is arranged between the convex portion of the distal piston end face and the concave portion of the inner surface of the container bottom. The uncured lens-forming material contained in the cavity is then cured. To perform curing, the control unit controls the mask such that light from the light source arranged beneath the container bottom impinges only on the uncured lens-forming material contained in the cavity, so that the uncured lens-forming material contained in the cavity is cured while the other lens-forming material in the container remains uncured. As the convex portion of the distal piston end face has a shape complementary to the shape of the posterior surface of the ophthalmic lens to be formed and the concave portion of the inner surface of the container bottom has a shape corresponding to the shape of the posterior surface of the ophthalmic lens to be formed, once the first layer of lens-forming material is cured the posterior surface of this first layer has the shape of the posterior surface of the ophthalmic lens to be formed and the anterior surface of this first layer has a complementary shape. This first layer is much thinner than the ophthalmic lens to be formed, so that a plurality of additional layers need to be cured one after the other.

Once the first layer has been cured, the control unit controls the mask such that no light from the light source arranged beneath the container bottom may pass through the mask (i.e the mask is controlled such that it is completely opaque for the light from the light source). The piston with the cured first layer of the ophthalmic lens adhered to the convex portion of the distal piston end face is moved upwards (i.e. away from the container bottom) to its uppermost position, so that uncured lens-forming material may flow into the space formed between the cured first layer and the concave portion of the inner surface of the container bottom. The piston is then moved downwards again (i.e. towards the container bottom) until a further (i.e. the second) layer of uncured lens-forming material is enclosed between the cured first layer of the ophthalmic lens adhered to the convex portion of the distal piston end face and the concave portion of the container bottom. The control unit then controls the mask to at least partially cure the second layer of uncured lens-forming material contained in the space between the cured first layer of the ophthalmic lens adhered to the convex portion of the distal piston end face and the concave portion of the inner surface of the container bottom. The second layer of uncured lens-forming material may be cured either wholly or only partially, so that after having formed the first layer each subsequent (further) layer may deviate in shape and thickness from the first layer. The geometry and thickness of each cured layer can be achieved by controlling the mask with the aid of the control unit.

Once the second layer of uncured lens-forming material has been cured, the control unit controls the mask such that no light from the light source arranged beneath the container bottom may pass through the mask. The piston with the cured first and second layer of the ophthalmic lens adhered to the convex portion of the distal piston end face is moved upwards again (i.e. away from the container bottom) to its uppermost position, so that uncured lens-forming material may flow into the space formed between the cured second layer and the concave portion of the inner surface of the container bottom. The piston is then moved downwards again (i.e. towards the container bottom) until another further layer (i.e. the third layer) of uncured lens-forming material is enclosed between the cured second layer of the ophthalmic lens adhered to convex distal piston end face together with the cured first layer of the ophthalmic lens and the concave portion of the container bottom. The control unit then controls the mask to at least partially cure the third layer of the uncured lens-forming material contained in the space between the cured second layer of the ophthalmic lens adhered to the convex portion of the distal piston end face together with the cured first layer and the concave portion of the container bottom. The third layer of uncured lens-forming material may be cured wholly or partially (as has been explained above for the second layer).

Once the third layer of uncured lens-forming material has been cured, the control unit controls the mask such that no light from the light source arranged beneath the container bottom may pass through the mask, the piston is moved upwards again (i.e. away from the container bottom), etc., to form another further layer of the ophthalmic lens in the same manner that has been describe above. This procedure of producing cured layers can be repeated as many times as necessary to produce the final ophthalmic lens having the desired shape of the posterior surface and the desired shape of the anterior surface, as well as any further desired additional structures, as will be described below. The method and apparatus according to the invention are highly efficient as they partly make use of known technologies (photolithography) which have been specifically adapted in a sophisticated manner to be able to produce low numbers of contact lenses from different lens-forming materials and having different geometries and/or additional other properties.

The mask described above may be a Thin Film Transistor (TFT) mask. Such masks are well-known in the art. By way of example, TFT masks are efficiently used in various types of displays (e.g. LCD displays) with high definition.

The mask may be controlled such that the ophthalmic lens may comprise voids and/or channels. For example, it is possible to provide medicaments (e.g. therapeutic liquids), such as medicaments against dry eye disease in these voids. Thus, the voids may act as small storage reservoirs. Alternatively or in addition, it may be possible to provide saline or artificial lacrimal fluid in the voids. Further alternatively or in addition, it may be possible to provide devices (e.g. micro-pumps, valves, flow regulators, electronic devices, etc.) in the voids. The channels allow for the delivery of the liquids from the reservoirs (voids) to the eye, possibly together with the devices that may drive and/or regulate the delivery of liquid. The voids and/or channels are typically formed in a peripheral portion of the ophthalmic lens different from the optical portion so as to not affect vision of the wearer of the ophthalmic lens. Generally, the provision of voids and/or channels for such purposes is known, for example, from US 2016/0109726. However, the voids and/or channels shown there are formed through etching techniques such as reactive-ion etching, wet etching, or other etching techniques which is comparatively laborious. According to aspects of the present invention, these voids and/or channels can be conveniently formed using lithographic techniques in which these voids and/or channels are formed through layer-by-layer constructions.

Further advantageous aspects of the method and apparatus according to the invention become evident from the following description of embodiments with the aid of the schematic drawings in which.

Figure 1:
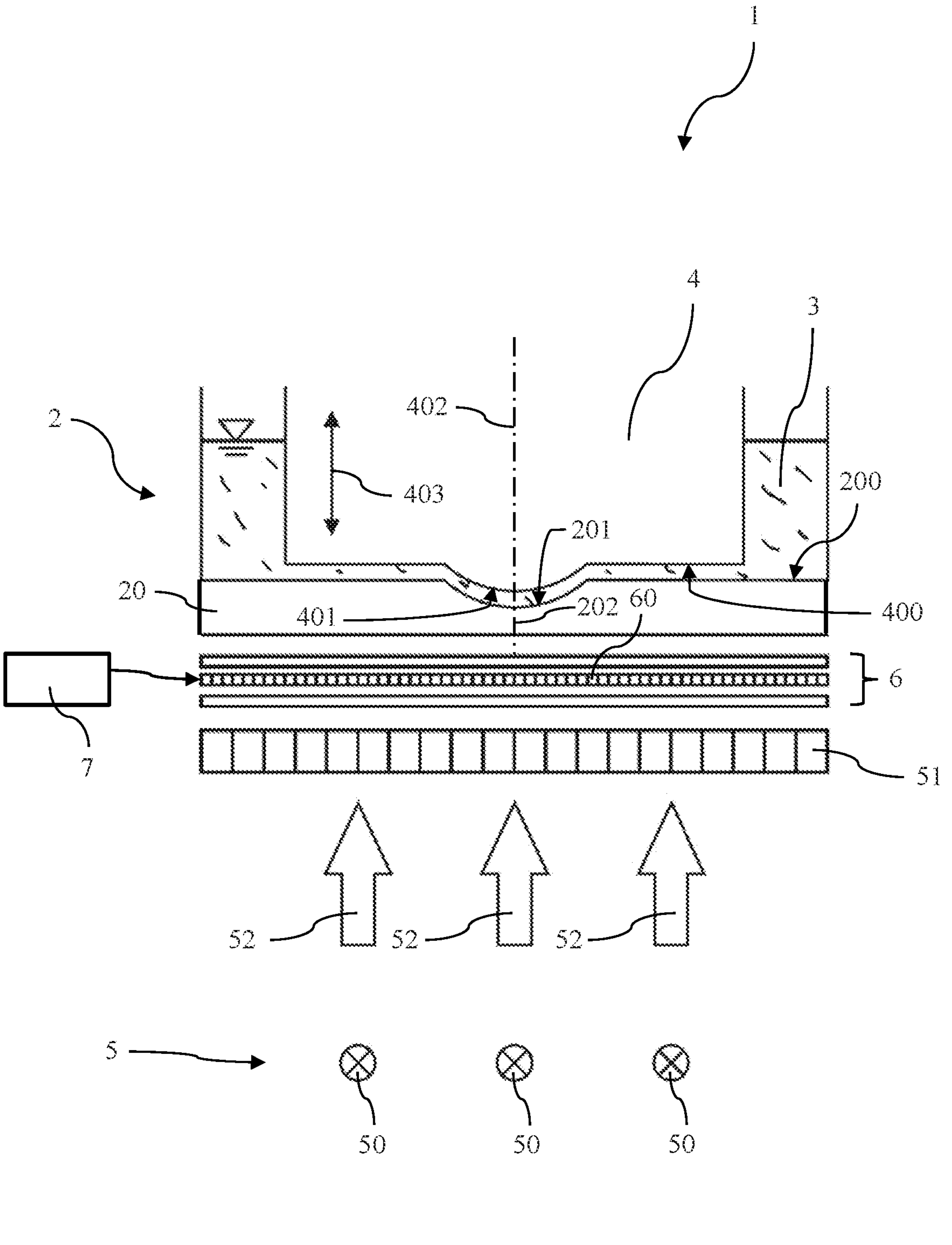
FIG. 1 shows an embodiment of the apparatus according to the invention in an initial state.

FIG. 1 shows an embodiment of the apparatus 1 according to the invention in an (arbitrary) initial state. Apparatus 1 comprises a container 2 that has a container bottom 20 with an inner surface 200 including a concave portion 201. The concave portion 201 of the inner surface 200 of container bottom 20 has a shape of a posterior surface of an ophthalmic lens to be formed. Container 2 contains uncured lens-forming material 3.

Apparatus 1 further comprises a piston 4 having a distal piston end face 400 with a convex portion 401. This convex portion 401 has a shape complementary to the shape of the posterior surface of the ophthalmic lens to be formed.

A first longitudinal axis 202 runs through the center of the concave portion 201 of the inner surface 200 of container bottom 20. A second longitudinal axis 402 runs through the center of the convex portion 401 of the distal piston end face 400 of piston 4. The first longitudinal axis 202 and the second longitudinal axis 402 are coincident. Piston 4 is arranged in the container 2 such that the convex portion 401 of the distal piston end face 200 faces the concave portion 201 of the inner surface 200 of container bottom 20, and is movable towards and away from container bottom 20 along the second longitudinal axis 402, as is indicated by double-headed arrow 403.

A light source 5 which—in the embodiment shown—is schematically represented by three spots 50 is arranged beneath the container bottom 20. A mask 6 is arranged between the light source 5 and the container bottom 20. By way of example, the mask 6 may be embodied as a TFT mask (Thin Film Transistor mask).

Optionally, the apparatus 1 may further comprise a lens arrangement 51 arranged between the light source 5 (represented by the spots 50) and the mask 6. The lens arrangement 51 may be a separate optical element or may be an element that is integral with the light source 5. Lens arrangement 51 may serve to homogenize the distribution of the intensity of the light 52 emitted from the spots 50 (indicated by the arrows) prior to impinging on the mask 6.

The mask 6 comprises a plurality of pixels 60 (in practice the individual pixels 60 are very significantly smaller than they are represented in the drawings) which are configured to be individually controlled to either allow the light 52 emitted from the light source 5 (or from the spots 50, respectively) or the homogenized light coming from the lens arrangement 51, to pass through the individual pixels 60 or to block the light from passing through the individual pixels 60.

Apparatus 1 further comprises a control unit 7 for controlling the individual pixels 60 of the mask 6. The control unit 7 is configured to control the individual pixels 60 of the mask 6 to either allow the light 52 to pass through the individual pixels 60 or to block the light 52 from passing through the individual pixels 60.

Operation of the apparatus 1 as well as a method of producing an ophthalmic lens will be described in the following.

Figure 2:
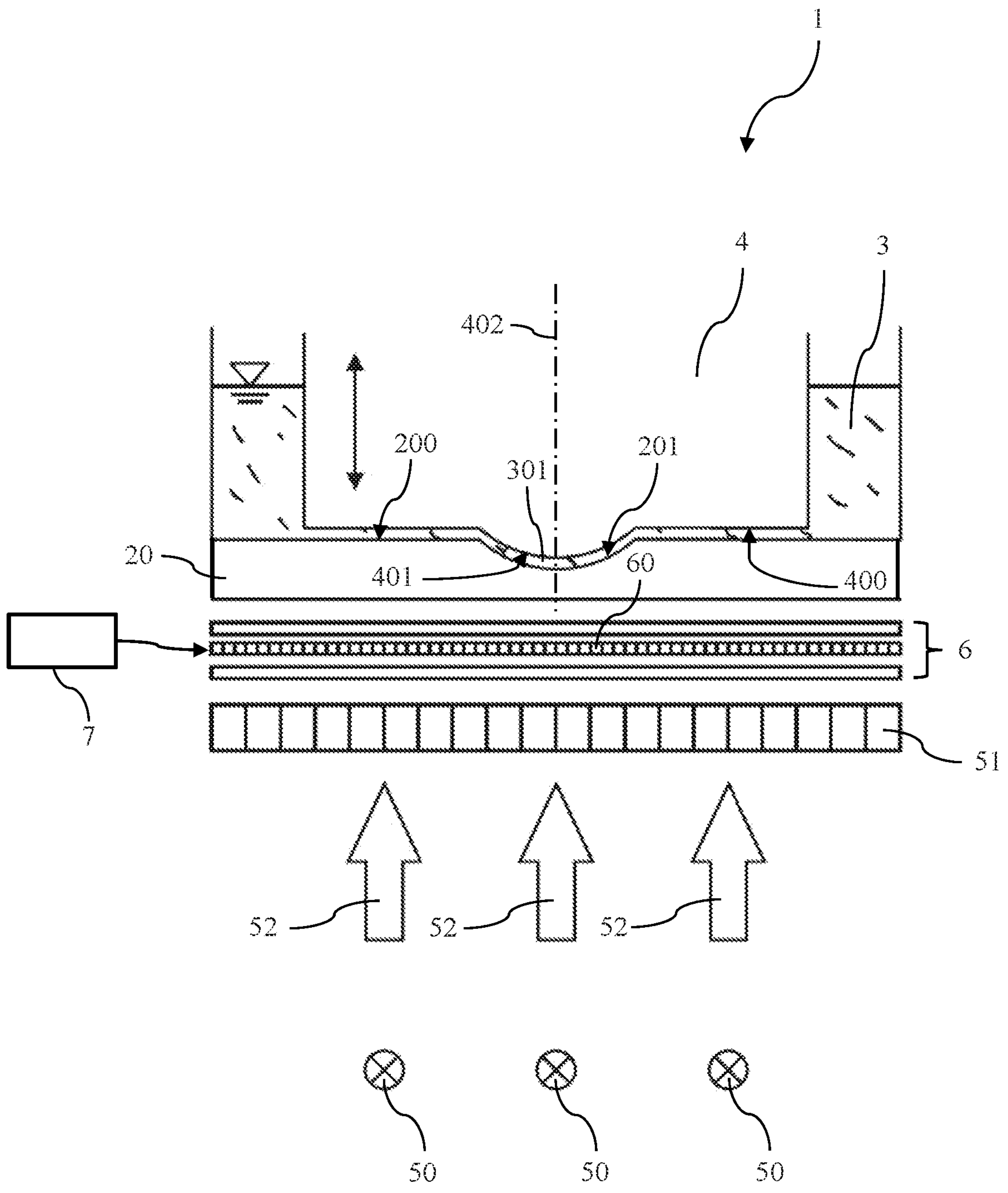
FIG. 2 shows the embodiment of the apparatus of FIG. 1, with the piston in a position immediately prior to curing the first layer of uncured lens-forming material to form the cured first layer of the ophthalmic lens.

Starting from the initial (arbitrary) state shown in FIG. 1, the piston 4 is moved along the second longitudinal axis 402 until a cavity 301 filled with a first layer of uncured lens-forming material 3 is formed between the convex portion 401 of the distal piston end face 400 and the concave portion 201 of the inner surface 200 of container bottom 20. This state is shown in FIG. 2.

Figure 3:
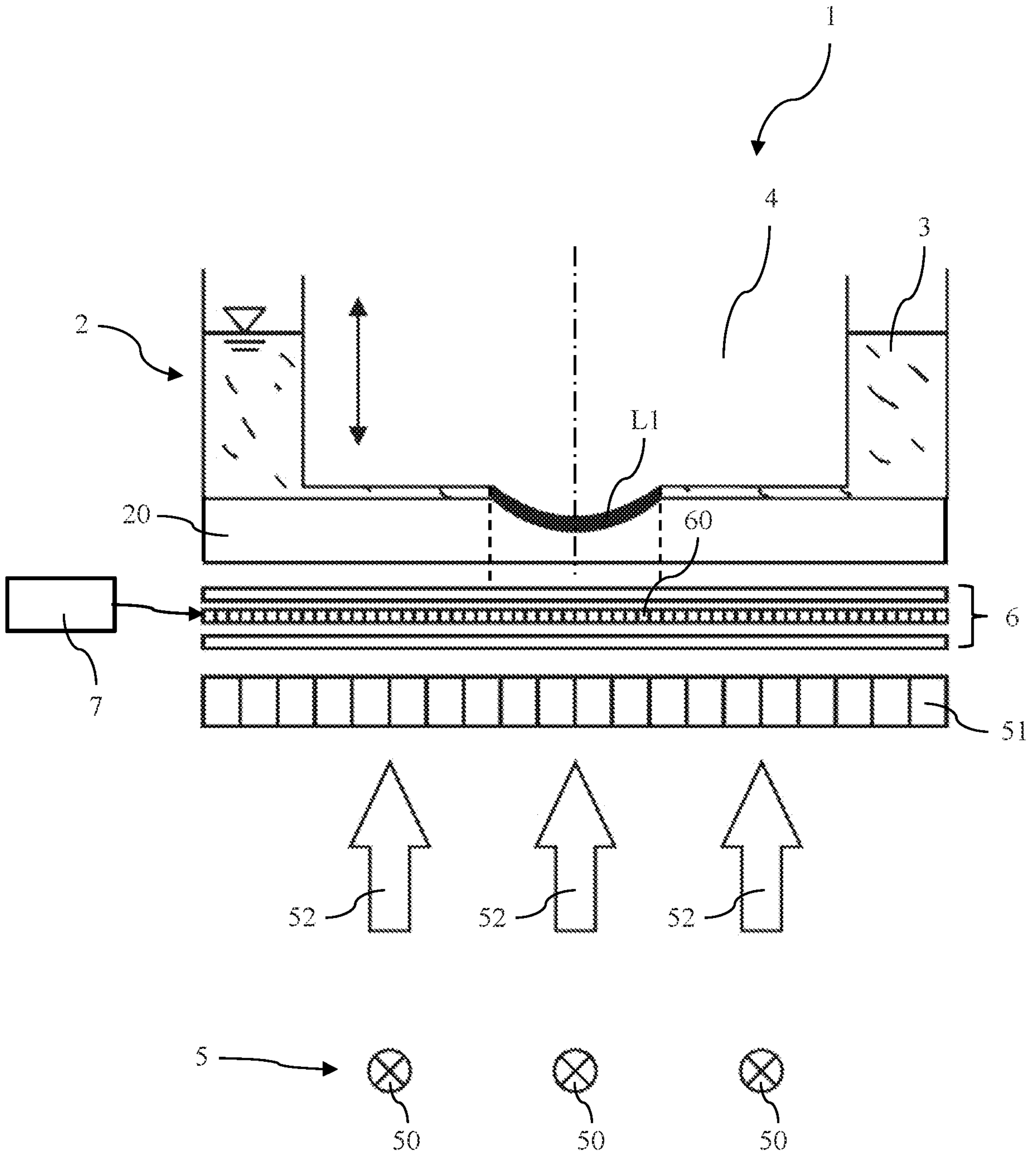
FIG. 3 shows the apparatus of FIG. 2, immediately after the cured first layer of the ophthalmic lens has been formed.
Figure 8:
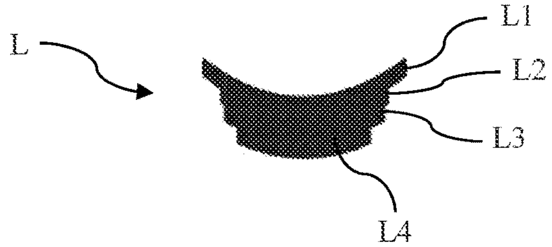
FIG. 8 shows the ophthalmic lens comprising the four layers.

Control unit 7 now controls the pixels 60 of the mask 6 such that the first layer of uncured lens-forming material 3 contained in the cavity 301 (and only the uncured lens-forming material 3 contained in the cavity 301) is impinged by the light 52 emitted from the light source 5 (or the three spots 50, respectively) and which is homogenized in intensity by the lens arrangement 51, as is indicated in FIG. 3 by the dashed lines. The duration of the impingement of the first layer of uncured lens-forming material 3 with the light is controlled by the control unit 7. Thus, the first layer of uncured lens-forming material 3 contained in the cavity 301 is cured to form a cured first layer L1 of the ophthalmic lens L (see FIG. 8) to be formed.

Figure 4:
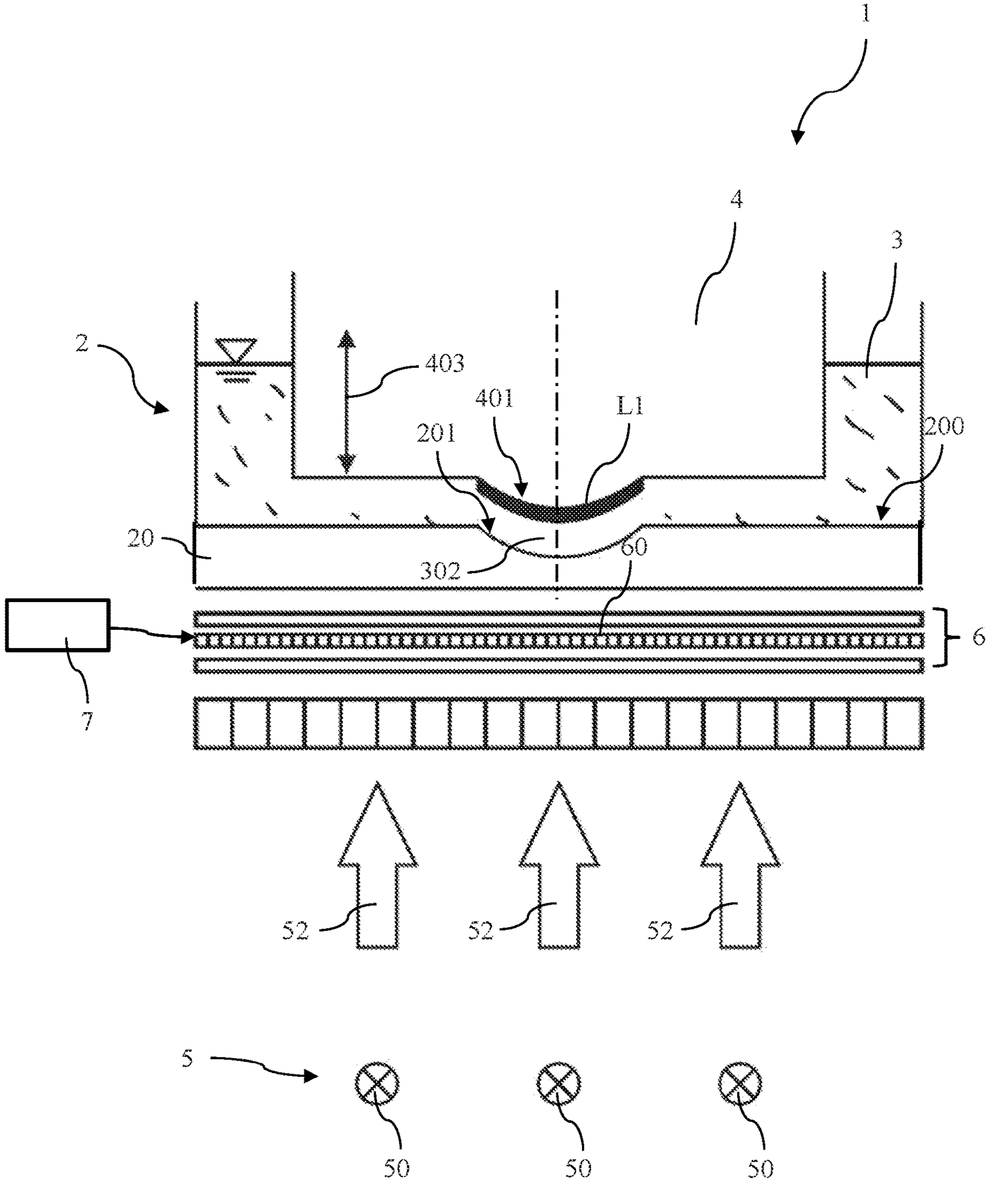
FIG. 4 shows the apparatus of FIG. 3, with the piston moved upwards towards the uppermost position, and with the cured first layer adhered to the convex portion of the distal piston end face.

Once the cured first layer L1 is formed, the control unit 7 controls the individual pixels 60 of the mask 6 such that no light is allowed to pass through (i.e. the mask 6 is shut). The piston 4 with the cured first layer L1 adhered to the convex portion 401 thereof is then moved upwards (double-headed arrow 403) to allow uncured lens-forming material 3 to flow into a space 302 between the cured first layer L1 of the ophthalmic lens L adhered to the convex portion 401 and the concave portion 201 of the inner surface 200 of container bottom 20, this state being shown in FIG. 4. Although not shown in FIG. 4, the piston 4 may be even be moved upwards to an uppermost position in which the piston 4 and the first layer L1 adhered to the convex portion 401 thereof are arranged outside the uncured lens-forming material 3 contained in container 2 (i.e. above the upper level of the uncured lens-forming material 3 contained in container 2).

Figure 5:
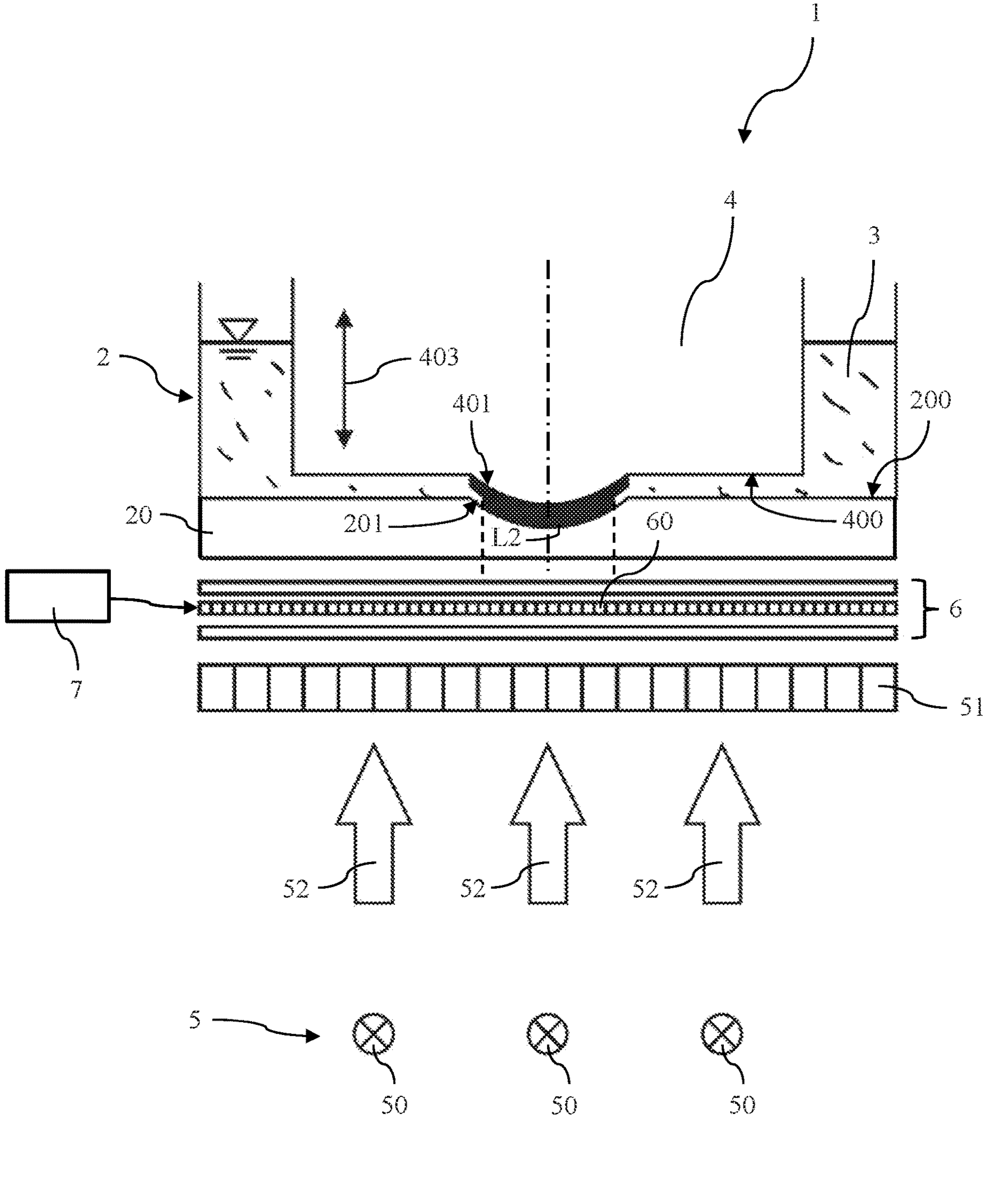
FIG. 5 shows the apparatus of FIG. 3, immediately after the cured second layer of the ophthalmic lens has been formed.

Piston 4 is then moved downwards again towards the bottom 20 of container 2 until a further layer of uncured lens forming material 3 is enclosed between the first layer L1 adhered to the convex portion 401 of the distal piston end face 400 and the concave portion 201 of the inner surface 200 of container bottom 20. Thereafter, control unit 7 controls the individual pixels 60 of the mask 6 to at least partially cure a further layer of uncured lens-forming material 3 to form a cured further layer second layer L2 of the ophthalmic lens to be formed. This is indicated in FIG. 5 by the dashed lines. In FIG. 5 the geometry of the cured second layer L2 is shown in a very general manner (while in fact the geometry of the cured second layer L2 typically has a continuous transition to the cured first layer L1) in order to show that the geometry of the various layers formed one after the other may be different from one another.

Once the cured second layer L2 is formed, the control unit 7 controls the individual pixels 60 of the mask 6 such that no light is allowed to pass through (i.e. the mask 6 is shut again). The piston 4 with the cured first layer L1 and second layer L2 (together) adhered to the convex portion 401 thereof is then moved upwards (double-headed arrow 403) to again allow uncured lens-forming material 3 to flow into a space 302 between the cured second layer L2 adhered to the convex portion 401 (together with the cured first layer L1) and the concave portion 201 of the inner surface 200 of container bottom 20, similar to the manner shown in FIG. 4, however, with the cured second layer L2 being adhered to the convex portion 401 of the distal piston end face 400. Also here, the piston 4 may be even be moved upwards to an uppermost position in which the piston 4 and the first layer L1 and the second layer L2 (together) adhered to the convex portion 401 thereof are arranged outside the uncured lens-forming material 3 contained in container 2 (i.e. above the upper level of the uncured lens-forming material 3 contained in container 2).

Figure 6:
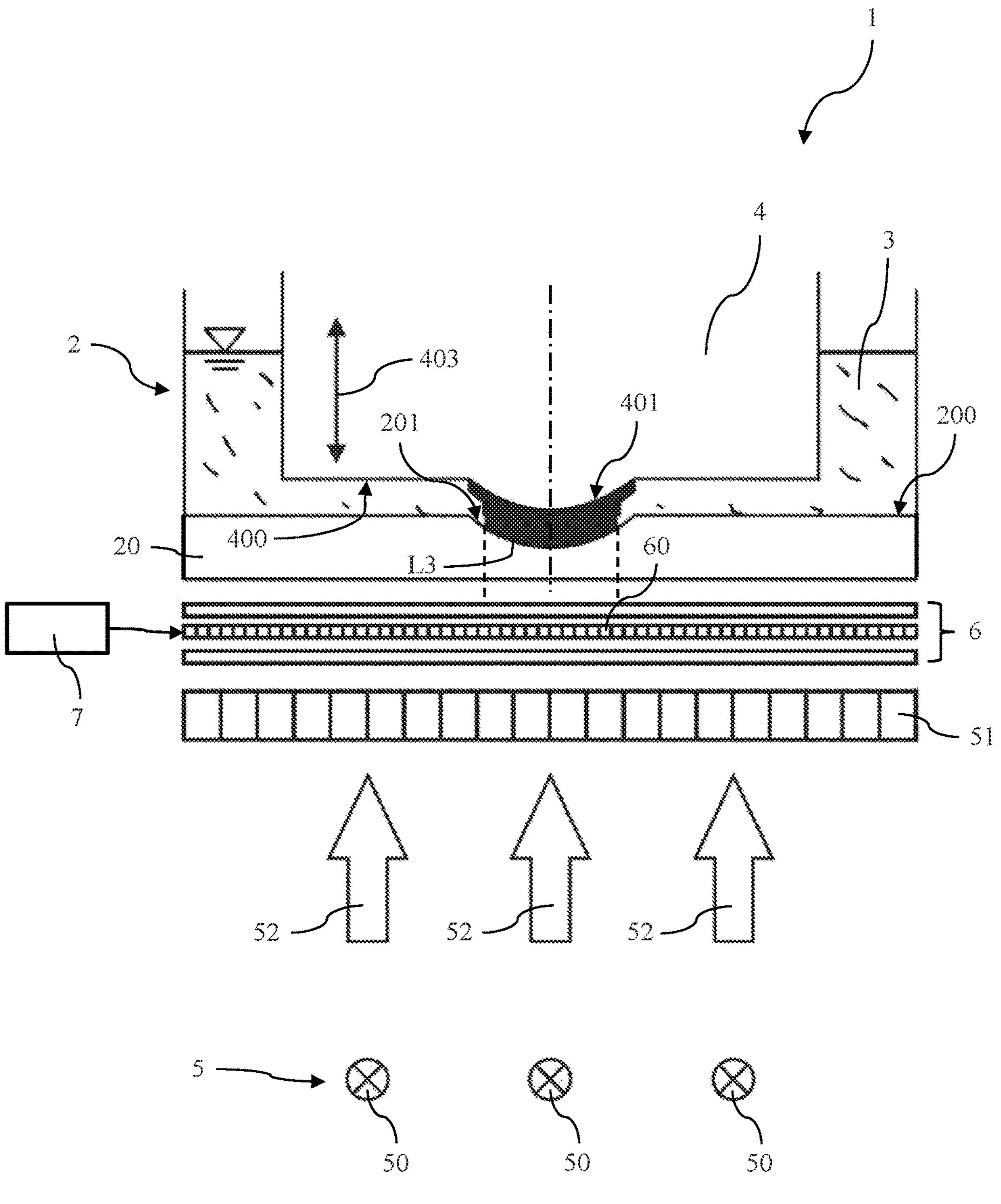
FIG. 6 shows the apparatus of FIG. 5, immediately after the cured third layer of the ophthalmic lens has been formed.
Figure 7:
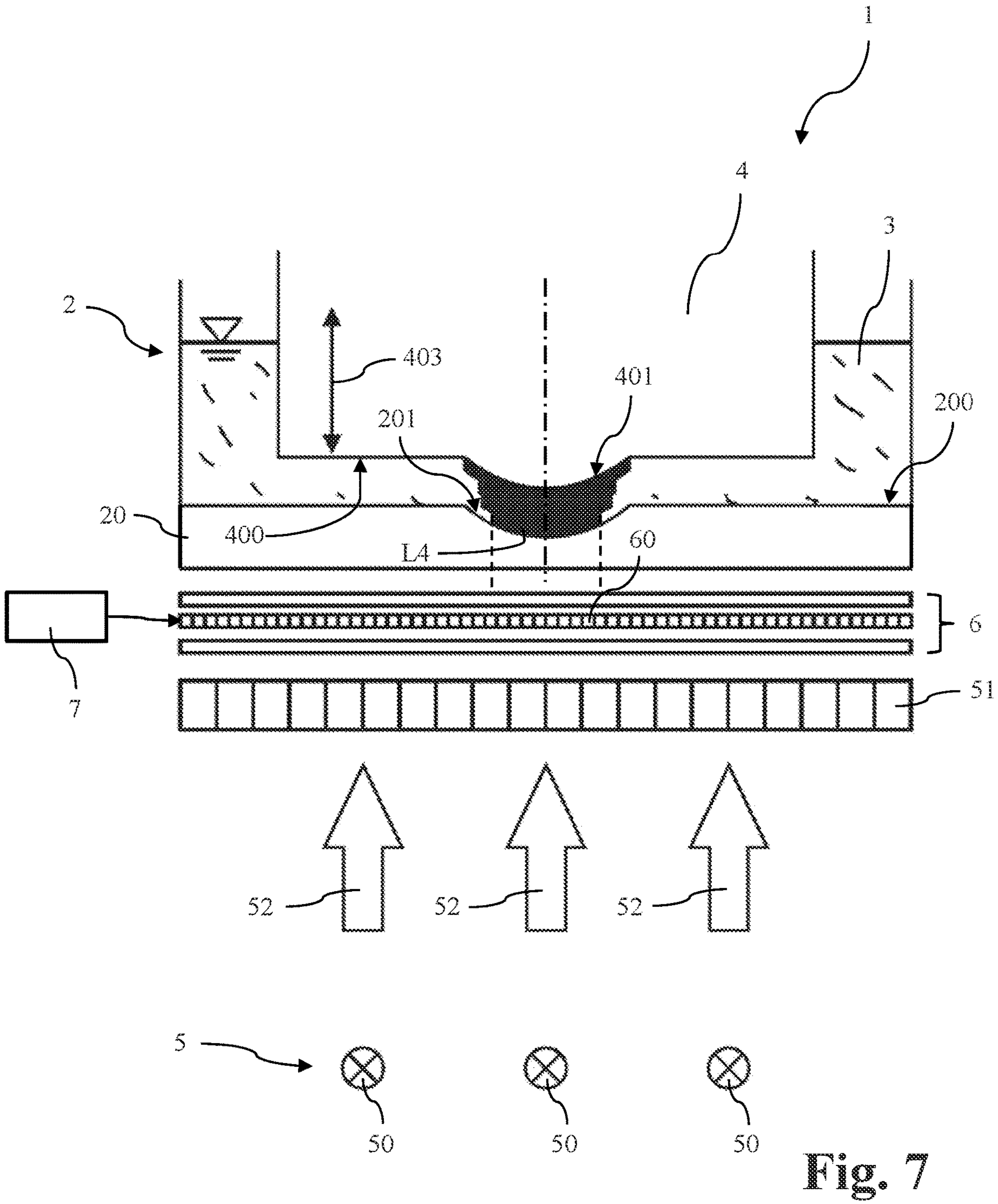
FIG. 7 shows the apparatus of FIG. 6, immediately after the cured fourth layer of the ophthalmic lens has been formed.

The above-described procedure is then repeated again in the same manner to form a cured third layer L3 of the ophthalmic lens L to be formed, this state being shown in FIG. 6, and to subsequently form a cured fourth layer L4, this state being shown in FIG. 7. As already mentioned, the geometry of the individual cured layers is shown in a very general manner to indicate that the geometries of the individual layers thus formed may be different from each other.

The piston 4 is then removed from the container and the ophthalmic lens L comprising the afore-described four individually cured layers L1-L4 is removed from the convex portion 401 of the distal piston end face 400 to which it is adhered. And while for the sake of simplification the ophthalmic lens L described before and shown in FIG. 8 comprises only four cured layers L1-L4, in practice the number of individually cured layers may be significantly higher than four. The four individually cured layers L1-L4 have been described by way of example only and in order to explain how the ophthalmic lens L is produced in a layer-by-layer process. Also, the individual layers are typically formed to have smooth transitions from one layer to the next.

The afore-described layer-by-layer process of producing an ophthalmic lens L may actually be used to produce a large variety of different ophthalmic lenses having different properties. And this can be easily performed by controlling the individual pixels 60 of the mask by means of the control unit 7. For example, it is possible to produce ophthalmic lenses having voids and/or channels. These voids and/or channels can be used for different purposes.

For example, it is possible to produce ophthalmic lenses having voids in which one or more (liquid) medicaments may be provided which may be released through channels also provided in the ophthalmic lens and connected to the voids. Alternatively or in addition, other liquids such as saline or lacrimal fluid may be provided in the voids and released through the channels. Further alternatively or in addition, (miniaturized) devices (e.g. micro-pumps, valves, flow regulators, electronic devices, etc.) may be provided in the voids. The provision of voids and/or channels for such purposes is known, for example, from US 2016/0109726, however, the voids and/or channels disclosed there are formed using etching techniques, which is comparatively laborious. Such voids and/or channels can be formed much easier using the afore-mentioned layer-by-layer lithographic process in that the individual pixels 60 of the mask 6 are controlled by the control unit 7 such that the voids and/or channels are formed during formation of the individual layers. The voids may be produced such that in a particular layer a small recess/cavity is formed by not curing the lens-forming material at the location where the void is to be formed in the said layer. When the next layer is formed, uncured lens-forming material flows into the small recess/cavity. During formation of the next cured layer, the uncured lens-forming material contained in the small recess/cavity of the preceding layer is enclosed by the next layer of cured lens-forming material. after the next layer has been formed. Once the ophthalmic lens has been formed, the uncured lens-forming material contained in the voids must be extracted and/or replaced by the liquid (e.g. medicament, saline, or lacrimal fluid) to be stored in the voids.

Figure 9:
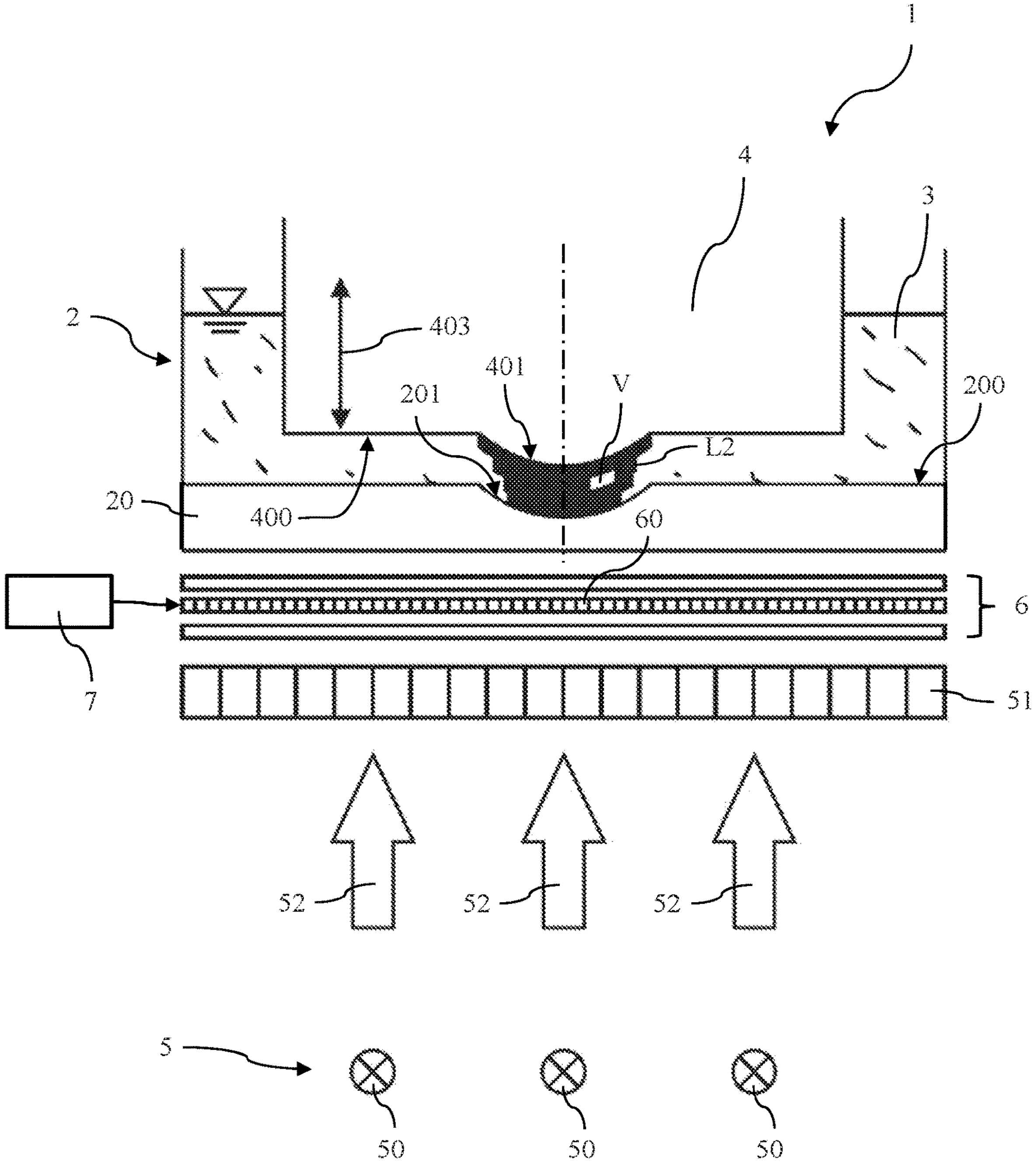
FIG. 9 shows the apparatus of FIG. 7, immediately after the cured fourth layer of a further embodiment of the ophthalmic lens has been formed (with voids)
Figure 10:
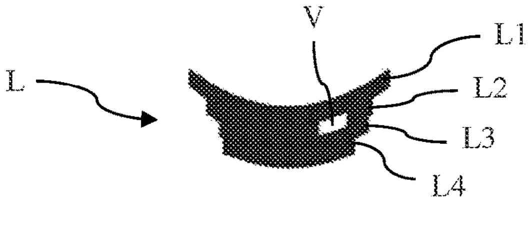
FIG. 10 shows the further embodiment of the ophthalmic lens (with voids).

Again for the sake of simplicity, the formation of a such void V in layer L2 is shown in FIG. 9 by way of example and in a very general manner. It goes without saying that a plurality of such voids and/or channels may be formed using this layer-by-layer lithographic technique. The ophthalmic lens L comprising the void V is shown in FIG. 10.

Embodiments of the apparatus and method according to the invention have been described with the aid of the drawings. However, the invention is not limited to these embodiments but rather is intended to cover various changes and modifications that do not depart from the technical teaching underlying the instant invention. The scope of protection is therefore defined by the appended claims.

The invention claimed is:

1. Apparatus (1) for photolithographically forming an ophthalmic lens (L), in particular a contact lens such as a soft contact lens, for example a silicone hydrogel contact lens, the apparatus comprising:

a container (2) comprising a container bottom (20) with an inner surface (200) including a concave portion (201) having a shape of a posterior surface of the ophthalmic lens (L) to be formed, with a first longitudinal axis (202) running through the center of the concave portion (201);

a piston (4) comprising a distal piston end face (400) with a convex portion (401) having a shape complementary to the shape of the posterior surface of the ophthalmic lens (L) to be formed, with a second longitudinal axis (402) running through the center of the convex portion (401);

wherein the piston (4) is arranged in the container (2) such that the convex portion (401) of the distal piston end face (400) faces the concave portion (201) of the inner surface (200) of the container bottom (20), with the first longitudinal axis (202) running through the center of the concave portion (201) of the inner surface (200) of the container bottom (20) and the second longitudinal axis (402) running through the center of the convex portion (401) of the distal end face (400) of the piston (4) being coincident, and wherein the piston is movably arranged in the container (2) along the second longitudinal axis (402) towards and away from the container bottom (20);

a light source (5, 50) being arranged beneath the container bottom (20) for emitting light towards the container bottom (20);

a mask (6) arranged between the light source (5, 50) and the container bottom (20), the mask (6) comprising a plurality of pixels (60) which are configured to be individually controlled to either allow the light emitted from the light source (5, 50) to pass through the individual pixels (60) and to impinge on that part of the container bottom (20) having the concave portion (201) of the inner surface (200), or to not allow the light emitted from the light source (5, 50) to pass through the individual pixels (60) and to prevent the light from impinging the container bottom (20), and a control unit (7) for controlling the individual pixels (60) of the mask (6) to allow for a formation of the ophthalmic lens (L) layer by layer (L1-L4).

2. Apparatus according to claim 1, wherein the mask (6) is a Thin-Film-Transistor (TFT) mask.

3. Apparatus according to claim 1, wherein the control unit (7) is configured to control the mask in a manner such that the photolithographically formed ophthalmic lens comprises voids (V) and/or channels.

4. Method for photolithographically forming an ophthalmic lens (L), in particular a contact lens such as a soft contact lens, for example a silicone hydrogel contact lens, the method comprising:

a) providing an apparatus (1) according to any one of the preceding claims;

b) dispensing an uncured lens-forming material (3) into the container (2);

c) moving the piston (4) along the second longitudinal axis (402) towards the container bottom (20) until a cavity (301) filled with a first layer of the uncured lens-forming material (3) is formed between the convex portion (401) of the distal piston end face (400) and the concave portion (201) of the inner surface (200) of the container bottom (20), the first layer of the uncured lens-forming material (3) having a thickness less than the thickness of the ophthalmic lens (L) to be formed;

d) controlling the mask (6) with the aid of the control unit (7) in a manner so as to allow light to pass through the mask (6) to cure the first layer of the uncured lens-forming material contained in the cavity to form a cured first layer (L1) of the ophthalmic lens (L);

e) moving the piston (4) along the second longitudinal axis (402) away from the container bottom (20), with the cured first layer (L1) of the ophthalmic lens adhered to the convex portion (401) of the distal piston end face (400), thus allowing the uncured lens-forming material (3) to flow into a space (302) between the cured first layer (L1) of the ophthalmic lens adhered to the convex portion (401) of the distal piston end face (400) and the container bottom (20);

f) moving the piston (4) along the second longitudinal axis (402) towards the container bottom (20) until a further layer of uncured lens-forming material (3) is enclosed between the cured first layer (L1) of the ophthalmic lens adhered to the convex portion (401) of the distal piston end face (400) and the concave portion (201) of the inner surface (200) of the container bottom (20);

g) controlling the mask (6) with the aid of the control unit (7) in a manner so as to allow light to pass through the mask (6) to at least partially cure the further layer of the uncured lens-forming material contained in the space to form a cured further layer (L2, L3, L4) of the ophthalmic lens;

h) moving the piston (4) along the second longitudinal axis (402) away from the container bottom (20), with the cured first layer (L1) and the cured further layer (L2, L3, L4) of the ophthalmic lens adhered to the convex portion (401) of the distal piston end face (400), thus allowing the uncured lens-forming material (3) to flow into the space between the cured further layer (L2, L3, L4) of the ophthalmic lens and the concave portion (201) of the inner surface (200) of the container bottom (20); and i) repeating steps f) to h) until the ophthalmic lens (L) is formed.

5. Method according to claim 4, wherein in step g) the mask (6) is controlled in a manner such that the further layer (L2, L3, L4) is only partially cured to form voids (V) and/or channels.

6. Method according to claim 4, wherein the method further comprises providing a medicament in the voids (V) and/or channels.

7. Method according to claim 5, wherein the method further comprises providing saline or an artificial lacrimal fluid in the voids (V) and/or channels.

8. Method according to claim 5, wherein the method further comprises providing devices, for example electronic devices, in the voids (V).

* * * * *